US012771088B2

(12) United States Patent
Provino et al.

(10) Patent No.: US 12,771,088 B2
(45) Date of Patent: Oct. 20, 2026

(54) VERY LARGE MODE AREA SINGLE-MODE AMPLIFYING OPTICAL FIBER AND FIBER AMPLIFIER OR LASER INCORPORATING THE SAME

(71) Applicant: PHOTONICS BRETAGNE, Lannion (FR)

(72) Inventors: Laurent Provino, Louannec (FR); Thierry Taunay, Lannion (FR)

(73) Assignee: PHOTONICS BRETAGNE, Lannion (FR)

( * ) Notice: Subject to any disclaimer, the term of this patent is extended or adjusted under 35 U.S.C. 154(b) by 685 days.

(21) Appl. No.: 18/254,108

(22) PCT Filed: Nov. 22, 2021

(86) PCT No.: PCT/EP2021/082451
§ 371 (c)(1),
(2) Date: May 23, 2023

(87) PCT Pub. No.: WO2022/112152
PCT Pub. Date: Jun. 2, 2022

(65) Prior Publication Data
US 2024/0097396 A1 Mar. 21, 2024

(30) Foreign Application Priority Data
Nov. 24, 2020 (EP) .................................... 20306434

(51) Int. Cl.
*H01S 3/067* (2006.01)
*H01S 3/08045* (2023.01)
(Continued)

(52) U.S. Cl.
CPC ...... *H01S 3/06733* (2013.01); *H01S 3/06712* (2013.01); *H01S 3/08045* (2013.01); *H01S 3/094007* (2013.01); *H01S 3/1623* (2013.01)

(58) Field of Classification Search
CPC ............ H01S 3/06733; H01S 3/06712; H01S 3/08045; H01S 3/094007; H01S 3/1623;
(Continued)

(56) References Cited

U.S. PATENT DOCUMENTS

| | | | |
|---|---|---|---|
| 2009/0262761 A1 | 10/2009 | Khitrov | |
| 2010/0195194 A1 | 8/2010 | Liu et al. | |

(Continued)

FOREIGN PATENT DOCUMENTS

| | | |
|---|---|---|
| JP | 2008511177 A | 4/2008 |
| JP | 2010534354 A | 11/2010 |

OTHER PUBLICATIONS

International Search Report for PCT/EP2021/082451 mailed Feb. 7, 2022, 3 pages.

(Continued)

*Primary Examiner* — Jessica S Manno
(74) *Attorney, Agent, or Firm* — NIXON & VANDERHYE

(57) ABSTRACT

Disclosed is a very large mode area single-mode amplifying optical fiber including a doped core having a core diameter larger than 20 micrometers, surrounded by at least a first cladding including a solid matrix made of a first glass and two stress applying parts arranged symmetrically with respect to the core, the two stress applying parts being aligned along an alignment axis, the cladding including two flat surfaces extending parallel to the longitudinal axis and transverse to the alignment axis, the two flat surfaces being joined by two rounded surfaces and wherein the optical fiber is suitable for being bent with a bending diameter less than 30 cm in a plane forming an angle of less than 15 degrees with the alignment axis while having bending losses below 0.5 dB/m.

16 Claims, 6 Drawing Sheets

(51) Int. Cl.
*H01S 3/094* (2006.01)
*H01S 3/16* (2006.01)

(58) Field of Classification Search
CPC ............... H01S 3/06741; H01S 3/0675; H01S 3/06754; H01S 3/094011; H01S 3/09408; H01S 3/09415; H01S 3/1601; H01S 3/06729
See application file for complete search history.

(56) References Cited

U.S. PATENT DOCUMENTS

2012/0219255 A1 8/2012 Bradley et al.
2017/0235049 A1 8/2017 Deladurantaye et al.

OTHER PUBLICATIONS

Written Opinion of the ISA for PCT/EP2021/082451 mailed Feb. 7, 2022, 8 pages.
Office Action, issued in Japanese Patent Application No. 2023-528951 dated Oct. 28, 2025.

VERY LARGE MODE AREA SINGLE-MODE AMPLIFYING OPTICAL FIBER AND FIBER AMPLIFIER OR LASER INCORPORATING THE SAME

CROSS-REFERENCE TO RELATED APPLICATIONS

This application is the U.S. national phase of International Application No. PCT/EP2021/082451 filed Nov. 22, 2021 which designated the U.S. and claims priority to EP patent application Ser. No. 20/306,434.0 filed Nov. 24, 2020, the entire contents of each of which are hereby incorporated by reference.

TECHNICAL FIELD OF THE INVENTION

The invention relates to a single-mode amplifying optical fiber, amplifier fiber or laser fiber for generating peak high power radiation with good spatial quality.

More precisely the invention relates to a fiber and a method for operating and manufacturing said optical fiber.

BACKGROUND INFORMATION AND PRIOR ART

Over the last fifteen years, the power of fiber lasers and/or fiber amplifiers, generating continuous and/or pulsed laser radiation, has dramatically increased. This is due in part to the design of rare earth doped optical fibers providing a gain medium having a length in the meter range while enabling heat dissipation along the fiber. Moreover, the development of fiber amplifiers based on large mode area fibers has resulted in dramatic increase in peak power, by limiting undesirable nonlinear optical effects such as four-wave mixing (FWM), Self-Phase Modulation (SPM) or Stimulated Raman Scattering (SRS). Indeed, these nonlinear optical effects are liable to induce spatial and temporal distortions in the amplified light pulses. These large mode area fibers enable to propagate a single mode over a large cross section.

Manufacturing single-mode optical fibers is a key parameter for delivering laser beams having good spatial quality, i.e. with a laser beam quality factor $M^2$ lower than 1.05 and as close as possible to 1. If the fiber is not single-mode but multi-mode, the beam quality is degraded. Only a single-mode fiber, or, in other words, a fiber with a single transverse propagation mode, enables obtaining the required laser beam quality.

Numerous documents describe devices and methods for producing large mode area single-mode amplifying optical fibers.

In the present document, a large mode area fiber (or LMA fiber) is defined as an optical fiber having an effective area (denoted $A_{eff}$) for the fundamental mode higher than approximately $90\lambda^2$ where $\lambda$ is the wavelength of a signal guided and amplified in the fiber. The effective area is commonly defined according to the following expression $$A_{eff} = \frac{\left(\int |E|^2 dA\right)^2}{\int |E|^4 dA}$$

where E is the spatial envelope of the electric field of the mode, the integrals being generally calculated over the total circular transverse area of the fiber. For a mode having an approximately Gaussian shape, the mode field diameter (or MFD) is given by the expression:

$$MFD = 2\sqrt{\frac{2\int |E|^2 dA}{\int \left|\frac{dE}{dr}\right|^2 dA}}$$

where r represents the radial coordinate. For a purely Gaussian mode, the effective area is linked to the mode field diameter by the following expression: $A_{eff}=\pi\times MFD^2/4$. The term «mode» herein refers to the transverse mode of an electro-magnetic wave, i.e. the light signal propagating in the fiber which may include the amplified or stimulated signal in the case of an amplifier, respectively a laser. In the present document, references made to light propagation in a single-mode are intended to include propagation in effectively a single transverse mode of nearly Gaussian shape.

More recently, very large mode area fibers are currently under development worldwide. A very large mode area fiber (or VLMA fiber) is defined as an optical fiber having an effective area for the fundamental mode higher than approximately $375\lambda^2$ where $\lambda$ is the wavelength of the signal.

In particular, different fiber optic designs have been proposed for manufacturing VLMA amplifying fibers.

A first approach is based on conventional step-index fibers comprising a solid core surrounded by a solid first cladding having a lower refractive index than the core. The core is generally doped with rare earth ions for amplifying the optical radiation. In conventional fibers, a signal coupled into the core propagates by total internal reflection due to the refractive index difference between the doped core and the cladding. However, manufacturing conventional large mode area fibers is all the more difficult as the effective area increases. Moreover, increasing the core diameter to obtain a large mode area renders the fiber multi-mode which results in the propagation of higher order modes. Different refractive index profiles for the core have also been proposed such as step-index, flat-top or parabolic profiles. It is possible to reduce the numerical aperture (NA) to reduce the number of supported modes. However, lowering the NA makes the manufacture of the fiber more difficult. Furthermore, a low NA results in high bending losses for bend diameter lower than 30 cm. Due to limitations in current industrial manufacturing processes, it is difficult to produce intrinsically single-mode conventional step-index fibers having a core diameter larger than 20 micrometers (µm). Furthermore, spooling a large mode area fiber to obtain a compact system induces couplings between higher orders modes (HOM) and losses due to bending. Patent documents US 2009/262761 and US 2010/195194 disclose VLMA amplifying optical fiber of the Panda type.

Another approach is based on the use of microstructured fibers or photonic crystal fibers (PCF) comprising a core surrounded by an array of air-holes or doped silica inclusions. As in conventional fibers, the signal propagates by total internal reflection due to the refractive index difference between the average refractive index of microstructured cladding and central solid-core. In theory, these fibers enable to obtain very large mode area, with an extremely low numerical aperture depending on the size of the air-holes or doped silica inclusions. However, microstructured fibers and PCFs are very sensitive to bending. Large mode area doped optical microstructured fibers have other drawbacks, such as manufacturing complexity, costs and fiber handling difficulties such as cleaving and splicing. Spooling microstructured fibers induces losses and might lead to a reduction in the effective mode area compared to the same fiber design in straight configuration. Thus, core diameter is generally limited to about 40 μm and PCF fibers are preferably used in a straight configuration, which limits in practice the fiber length compatible with compactness requirements for a laser system. Furthermore, elevated concentration of aluminium oxide ($Al_2O_3$) and/or phosphorus pentoxide ($P_2O_5$) co-dopants are required with rare earth ions doped fibers to prevent adverse effects such as photodarkening and clustering effects which degrade fiber amplifiers short and long term performances. In addition, PCF designs require nearly equal or slightly below silica core index which limit co-dopants incorporation and/or rare earth ions increase concentrations before onset of detrimental effects.

Still another approach is based on the use of a polarization-maintaining ytterbium-doped fiber (PM-YDF) based on a PCF with very large air-holes. X. Peng an L. Dong ("Fundamental mode operation in polarization-maintaining ytterbium-doped fiber with an effective area of 1400 $\mu m^2$" Opt. Lett. Vol. 32, no. 4, Feb. 15, 2007 pp. 658-360) disclose a PM-YDF comprising two boron-doped stress elements and four holes around a core with a diameter of about 50 μm. This fiber has a critical bending radius of 4 cm for the fundamental mode and operates in single-mode when air-holes dimensions are precisely engineered to create large leakage loss for high-order modes. As PCF fibers, the doped area of the core presents a refractive index very slightly below the refractive index of silica by $2.0\times10^{-4}$.

An alternative approach uses polarizing PCF fibers or microstructured fibers intrinsically supporting a few modes, which are forced into single-mode operation through bending with a bending radius of less than 40 cm. However, the effective area of these fibers cannot be arbitrarily scaled up with the size of the fiber core. Moreover, the output power drops if the bending diameter is less than 30 cm.

To date, the largest power obtained is 1500 W in continuous-wave operation using a PM fiber.

However, it is increasingly difficult to achieve single-mode operation at larger core diameter.

There is a need for a fiber design enabling to obtain a very large-mode area single-mode amplifying fiber, at low manufacturing costs and which is easy to splice with conventional step-index single-mode fibers.

SUMMARY OF THE INVENTION

Therefore, one object of the invention is to provide a very large mode area single-mode amplifying optical fiber.

The above objects are achieved according to the invention by providing an optical fiber comprising a core extending along a longitudinal axis of the optical fiber, the core being solid and doped with elements presenting at least one emission band, the core having a core diameter larger than 30 μm, said core being surrounded by at least one glassy cladding comprising a first cladding, the first cladding comprising a solid matrix made of a first glass and two stress applying parts (or SAPs) arranged symmetrically with respect to the core, the first glass having a lower refractive index than the core, the core and the two stress applying parts being aligned along an alignment axis transverse to the longitudinal axis, wherein the at least one glassy cladding comprises, on its outer periphery, two flat surfaces extending parallel to the longitudinal axis and transverse to the alignment axis, the two flat surfaces being arranged symmetrically with respect to the core and being joined by two rounded surfaces and wherein the optical fiber is suitable for being bent with a bending diameter less than 30 cm in a plane comprising the longitudinal axis of the fiber and said plane forming an angle of less than 15 degrees with the alignment axis while having bending losses less than 0.5 dB/m for the fundamental mode.

The optical fiber is adapted for amplifying a signal at a wavelength corresponding to the emission band of the ions. This design and configuration enable to obtain an amplifying optical fiber having a very large mode area and operating in single-mode regime. Due to the two stress applying parts, this amplifying optical fiber is a polarization-maintaining fiber. Moreover, when bending or spooling the fiber, the two flat surfaces mechanically induce bending the fiber in a plane forming an angle of less than 15 degrees with the alignment axis of the two stress applying parts. This bending enables to suppress the higher order modes, while inducing limited losses on the fundamental mode, thus enabling the fiber to amplify the fundamental mode in single mode regime.

Indeed, for a given bend diameter (less than 30 cm), the fiber presents losses for the High Order Modes (HOMs) equal or greater than 10 dB/m, and thus operates in single-mode regime.

According to particular aspects of the present disclosure:

- the bending diameter is comprised between 10 cm and 30 cm or between 10 cm and 20 cm, with bending losses less than 0.5 dB/m for the fundamental mode;
- the optical fiber is bent in a plane forming an angle of less than 10 degrees, and preferably less than 5 degrees, with the alignment axis;
- the fiber has an effective area greater than 375 $\mu m^2$, and preferably greater than 450 $\mu m^2$, at a signal wavelength suitable for being amplified by said fiber;
- a refractive index difference between the core and first glass is greater than 5.10-4;
- the refractive index difference between the core and first glass is comprised between $5\cdot10^{-4}$ and $2.5\cdot10^{-3}$ or between $5\cdot10^{-4}$ and $1\cdot10^{-3}$;
- the core and first glass are based on silica glass or on fluoride glass or on chalcogenide glass or a phosphate glass;
- the stress applying parts comprise silica doped with boron oxide, boron co-doped with germanium oxide, fluorine oxide or phosphorus oxide, or silica doped with phosphorus oxide co-doped with aluminium oxide, or aluminium co-doped with phosphorus oxide or any doping combination creating a stress region whose refractive index is lower than the first glass;
- the core is doped with rare earth ions;
- the rare earth ions are selected among any lanthanide ion presenting at least one emission band;
- the rare earth ions are selected among ytterbium, erbium, thulium and holmium or any combination thereof;
- the core is doped with elements presenting an emission band in a glass, such as chromium ions or any other metallic ions presenting at least one emission band between 800 nm and 2500 nm (nanometers);
- the core presents a flat-top (step-index fiber) or a parabolic refractive index profile;
- the core comprises a pedestal surrounding a central part of the core, the pedestal having a refractive index lower than the central part of the core and higher than the first glass;

the at least one glassy cladding consists of the first cladding, the first cladding comprising, on its outer periphery, the two flat surfaces;

the at least one glassy cladding comprises a second cladding arranged around the first cladding, the second cladding having a lower refractive index than the first glass;

the second cladding is selected from an all solid cladding made of a second glass or an air cladding and a solid cladding made of a second glass, the air cladding being arranged between the first cladding and the solid cladding made of the second glass;

the fiber further comprises a polymer or metal cladding around said at least one glassy cladding.

A further object of the invention is to provide a fiber amplifier comprising a very large mode area single-mode amplifying optical fiber according to any one of the embodiments disclosed, said very large mode area single-mode amplifying optical fiber being spooled around a coil or around a circular plate with a bending diameter less than 30 cm.

According to particular aspects of the fiber amplifier according to the present disclosure:

the optical fiber has a length comprised between 50 cm and 20 m;

the bending diameter is comprised between 10 cm and 25 cm, and preferably between 15 cm and 20 cm;

the optical fiber presents an effective area greater than 375 $\mu m^2$ and preferably greater than 450 $\mu m^2$;

the fiber amplifier comprises a pump source generating a pumping beam and an optical beam combiner adapted for injecting said pumping beam into the core and/or into the first cladding;

the fiber amplifier is configured to amplify a beam at a wavelength comprised between 800 nm and 2500 nm, depending on the doping elements of the core.

A further object of the invention is to provide a fiber laser comprising a very large mode area single-mode amplifying optical fiber according to the present disclosure, said very large mode area single-mode amplifying optical fiber being spooled with a bending diameter less than 30 cm and the fiber laser further comprising a first mirror at a first end of the very large mode area single-mode amplifying optical fiber, and a second mirror at a second end of the very large mode area single-mode amplifying optical fiber.

Advantageously, the first mirror and/or the second mirror comprises a fiber Bragg grating.

DETAILED DESCRIPTION OF EXAMPLE(S)

The following description with reference to the accompanying drawings will make it clear what the invention consists of and how it can be achieved. The invention is not limited to the embodiment/s illustrated in the drawings. Accordingly, it should be understood that where features mentioned in the claims are followed by reference signs, such signs are included solely for the purpose of enhancing the intelligibility of the claims and are in no way limiting on the scope of the claims.

In the accompanying drawings:

FIG. 1 represents schematically in cross-section a step-index large mode area optical fiber design and its geometrical parameters according to the present disclosure;

FIG. 2A represents schematically a first example of a refractive index profile along the alignment axis of the stress applying parts for a single-mode polarization-maintaining fiber according to the present disclosure; FIG. 2B represents schematically a second example of a refractive index profile along the alignment axis for a single-mode polarization-maintaining fiber according to the present disclosure;

DEVICE

Figure 1:
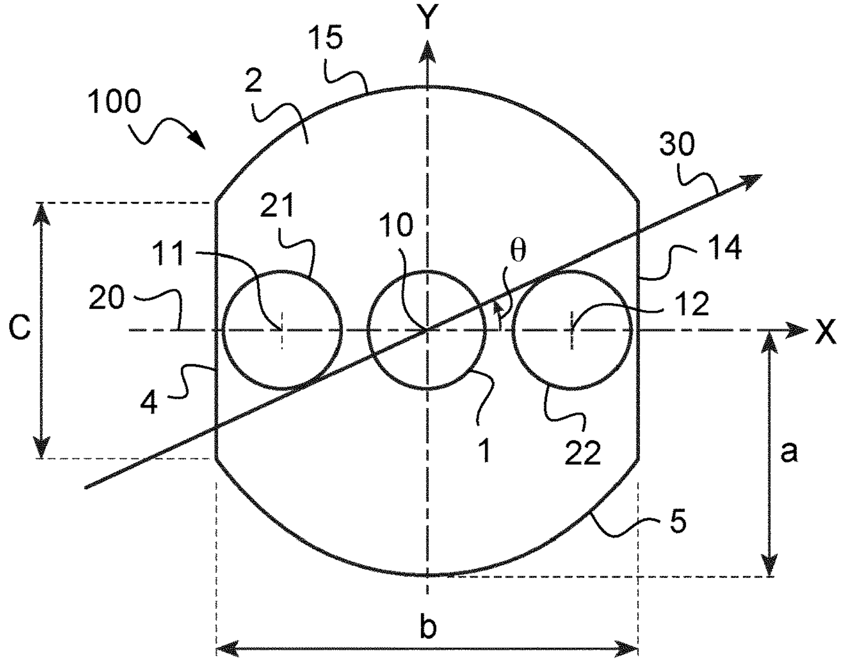

We propose a very large mode area fiber 100 of the step-index type having a core 1 doped with ions presenting at least one emission band and at least one first cladding 2 surrounding the core 1. The core 1 extends along a longitudinal axis 10 of the optical fiber. Generally, the core 1 is doped with rare earth ions. For example, the rare earth ions are selected among any lanthanide ion. Preferably, the rare earth ions are selected among ytterbium, erbium, thulium and holmium or any combination thereof, such as erbium-ytterbium co-doping. Alternatively, the core 1 is doped with chromium or bismuth ions. In the following example, the core 1 is based on a silica matrix doped with ytterbium ions.

The core 1 is solid. The core 1 has generally a step-index profile relatively to the first cladding. For example, the core 1 has a flat-top or parabolic refractive index profile. The core has generally a cylindrical shape with a circular cross-section. The core center is merged with the longitudinal axis 10 of the optical fiber.

The first cladding 2 comprises a solid matrix made of a first glass and including two stress applying parts (or SAPs) 21, 22. The two stress applying parts 21, 22 are arranged symmetrically with respect to the core 1 inside the solid matrix of the first cladding 2. In a cross-section plane (the plane of FIG. 1), the optical fiber 100 presents an alignment axis 20 passing through the core 1 and the two stress applying parts 21, 22. The first cladding 2 does not include any hole or any other inclusion except for the two stress applying parts 21, 22. In other words, the first cladding 2 is without any hole or is not a holey structure. Thus, the first cladding 2 is all-solid.

In the first embodiment illustrated on FIG. 1, each of the two stress applying parts 21, 22 has a cylindrical shape with a circular or a disk cross-section. Let's denote the center 11, respectively 12, of the stress applying part 21, respectively 22. The centers 11 and 12 are aligned along the alignment axis 20 passing through the longitudinal axis 10 of the fiber with an accuracy of a few degrees. The longitudinal axis 10 is perpendicular to the plane of FIG. 1. This design forms a polarization-maintaining fiber of the Panda type.

Alternatively, the SAPs have another shape, such as a sector shape and are placed symmetrically with respect to the core 1, so as to form a polarization-maintaining fiber of bow-tie type.

In the first embodiment illustrated on FIG. 1, the first cladding 2 has a cylindrical shape with a non-circular cross section. More precisely, the first cladding 2 comprises two flat surfaces 4, 14. The flat surface 4 is joined to the other flat surface 14 by two rounded surfaces 5, 15. Generally, each rounded surface 5, 15 has the shape of an arc of circle, or arc of circumference, in the cross-section plane. Each flat surface 4, 14 extends parallel to the longitudinal axis 10 of the fiber and transversely to the alignment axis 20. Preferably, the two flat surfaces 4, 14 are parallel to each other and perpendicular to the alignment axis 20.

The geometry of the glass cladding with the two flat surfaces 4, 14 combined with the two rounded surfaces and the stiffness of the cladding material provide the optical fiber with the property of preferential coiling in a plane transverse to the two flat surfaces 4, 14 and more precisely in a plane comprising the alignment axis 20 of the two stress applying parts 21, 22 and the longitudinal axis 10 of the fiber. Thus bent, the radius of curvature of the fiber is transverse to the flat surfaces 4, 14. In the present document, the expression "plane transverse to the flat surfaces" means that the plane is inclined by an angle $\theta$ less than 20 degrees, and preferably less than 15 degrees, with respect to the alignment axis 20. More precisely, each turn of the fiber 100 generally lies in a plane forming an angle below 20 degrees with respect to the alignment axis 20.

In an example, the first cladding 2 is made of a silica glass (or quartz glass), for example based on a pure silica ($SiO_2$) matrix. Alternatively, the first cladding 2 is made of a non-silicon oxide glass. For example, the first cladding 2 is made of a fluoride glass (for example ZBLAN). In another example, the first cladding 2 is made of a chalcogenide glass, i.e. a glass containing one or more chalcogens such as sulfur, selenium and/or tellurium but excluding oxygen. And in another example the first cladding 2 is made of phosphate glass. The core 1 is made of the same type of glass as the first cladding 2, either based on a silicon oxide glass, a fluoride glass, a chalcogenide glass or a phosphate glass, the core 1 further comprising active dopants.

The two stress applying parts 21, 22 are made of doped glass bars. For example, the two stress applying parts 21, 22 are made of silica glass bars doped with boron trioxide ($B_2O_3$). Alternatively, the stress applying parts 21, 22 are made of glass bars co-doped with aluminium oxide and boron trioxide ($Al_2O_3$—$B_2O_3$) or co-doped with aluminium oxide and phosphorus pentoxide ($Al_2O_3$—$P_2O_5$) or doped with any combination of dopants suitable for forming a stress applying part having a negative refractive index difference with respect to the first glass of the first cladding 2. As an example, the refractive index difference between the stress applying parts 21, 22 and the first glass of the cladding 2 is of the order of $-10\cdot10^{-3}$. The optical fiber 100 is a polarization-maintaining fiber.

Figure 2A:
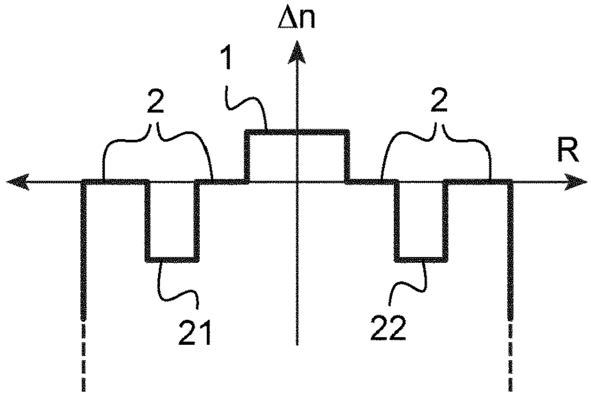

FIG. 2A schematically represents a cut-view of the refractive index profile of an optical fiber according to an example of the present disclosure. In this example, the core 1 has a flat-top refractive index profile. This fiber is also called a step-index fiber. The core 1 has a higher refractive index than the matrix of the first cladding 2. The stress applying parts 21, 22 have a lower refractive index than the matrix of the first cladding 2.

For fiber laser and amplifiers based on single mode VLMAs working in the 1000 nm spectral range, the refractive index difference between the core 1 and the matrix of the first cladding 2 is greater than $5\cdot10^{-4}$, and generally comprised in a range between $5\cdot10^{-4}$ and $1\cdot10^{-3}$. Such a small refractive index difference requires a tight control of the dopants during the manufacture of the fiber preform. This range of refractive index difference enables the core to provide a numerical aperture comprised between 0.038 and 0.054. For fiber laser and amplifiers based on single-mode VLMAs working in the 2000 nm spectral range, the maximum refractive index difference is on the order of $2\times10^{-3}$.

Figure 2B:
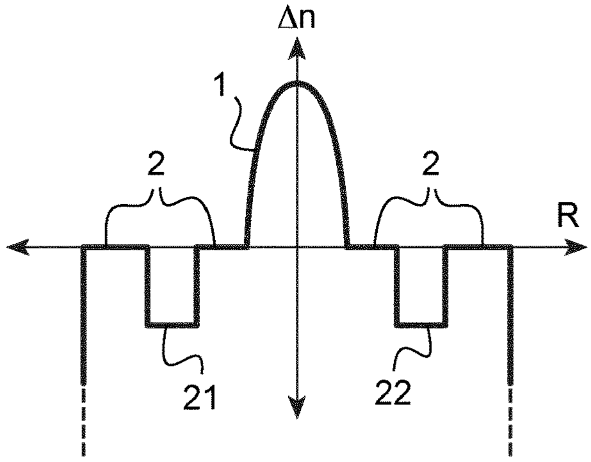

FIG. 2B schematically represents a cut-view of the refractive index profile of an optical fiber according to another example of the present disclosure. In this example, the core has a parabolic refractive index profile. The first cladding 2 and stress applying parts 21, 22 are similar to the ones illustrated on FIG. 2A. Advantageously, the parabolic profile provides the fundamental mode with a higher immunity toward bending, due to a lesser reduction in the effective mode area.

Figure 8A:
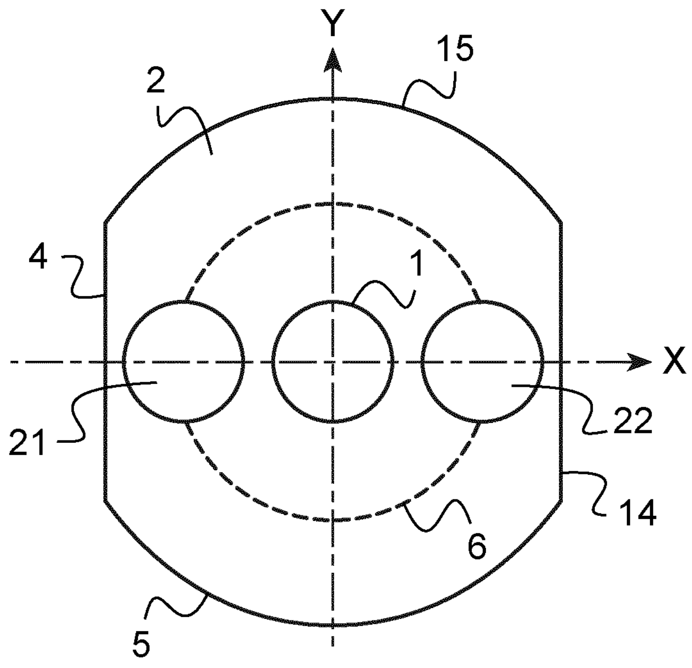
FIGS. 8A, 8B, 8C and 8D represent schematically in cross-section variants or alternative embodiments of an optical fiber according to the present disclosure.

According to a variant of the refractive index profile as illustrated on FIG. 8A, the fiber core may comprise a pedestal 6 between the central part of the core 1 and the first cladding 2. A pedestal consists of a solid annular region surrounding the central part of the core and having a refractive index lower than the central part of the core 1 and higher than the matrix of the first cladding 2. The ratio between the diameter of the pedestal and the core diameter is at least of the order of 2. The pedestal enables to decrease the refractive index difference between the core 1 and first glass of the first cladding 2.

Figure 8B:
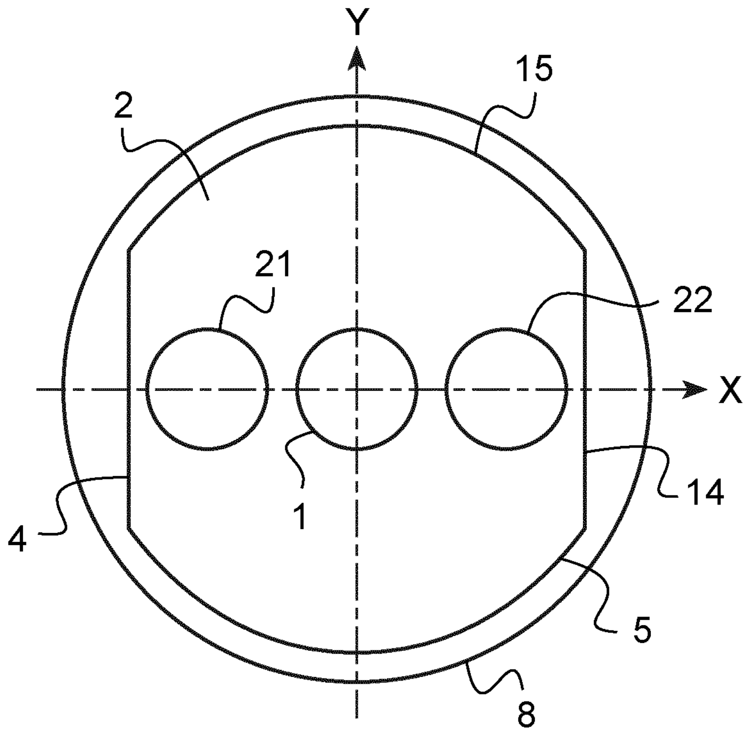

The first cladding may be uncoated. Alternatively, the first cladding is coated with an outer cladding 8 (see FIG. 8B). The cladding 8 is for example made of low refractive index polymer (as compared to the refractive index of the first cladding 2) so as to form a double clad fiber with a numerical aperture greater than 0.35. The outer cladding 8 also has a lower stiffness, or higher modulus of elasticity, than the first cladding 2. The outer cladding 8 may have a circular cross-section. For example, the first cladding 2 is made of quartz glass having a modulus of elasticity (at 20° C.) of about $7.25\times10^4$ N/mm$^2$. The first cladding 2 diameter, denoted 2*a*, is about 220 μm and the length C of the flat surfaces is about 80 to 125 μm. The cladding 8 is a low refractive index primary coating made of a polymer. The polymer presents a modulus of elasticity (at 20° C.) between 20 N/mm$^2$ and 500 N/mm$^2$. The outer cladding 8 thickness is about 50 μm. For example, the polymer is OF-1375-A manufactured by MY Polymers Ltd. Thus, the stiffness of the first cladding 2 is such that the optical fiber 100 may be bent in a bending plane 30 transverse to the flat surfaces 4, 14 i.e. with an angle $\theta$ less than 15 degrees. Since there are only two flat surfaces, parallel to each other, the bending occurs preferably in a plane transverse to the two flat surfaces. Thus, spooling the fiber in the right plane is easy.

Figure 8C:
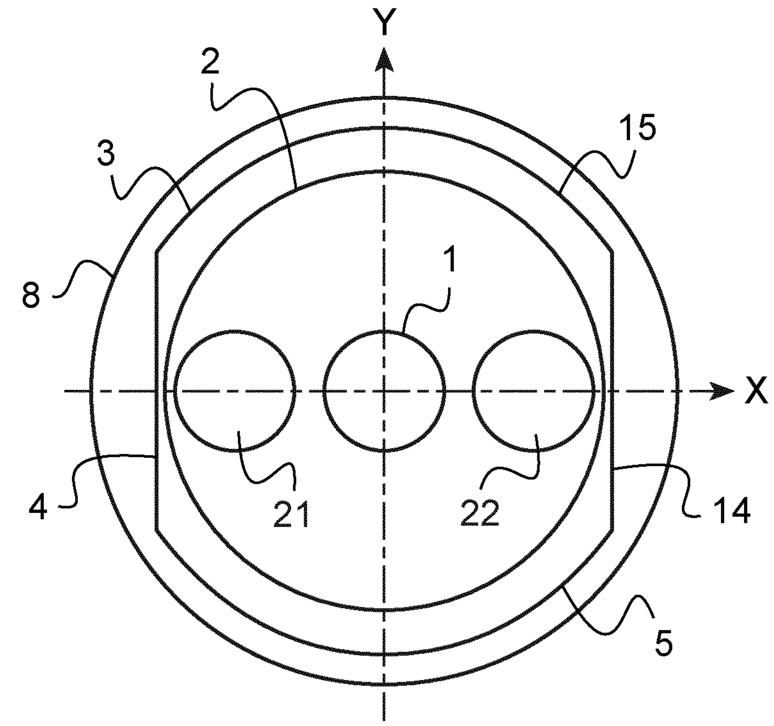

According to a second embodiment, the first cladding 2 is surrounded by a second cladding 3 comprising a matrix made of a second glass whose index is lower than the first glass of the first cladding 2 (see FIG. 8C). The second cladding 3 can be doped with fluorine to provide a refractive index difference with the first glass up to $-26.0\times10^{3}$ so as to form an all-glass double clad fiber. In this case, the first cladding 2 may have a circular cross-section and the second cladding 3 has the two flat surfaces 4, 14 extending transversely to the alignment axis of the stress applying parts 21, 22. As disclosed in relation with the first embodiment; the two flat surfaces 4, 14 are joined by two rounded surfaces 5, 15. And the outer cladding 8 is made of high index acrylate coating.

Figure 8D:
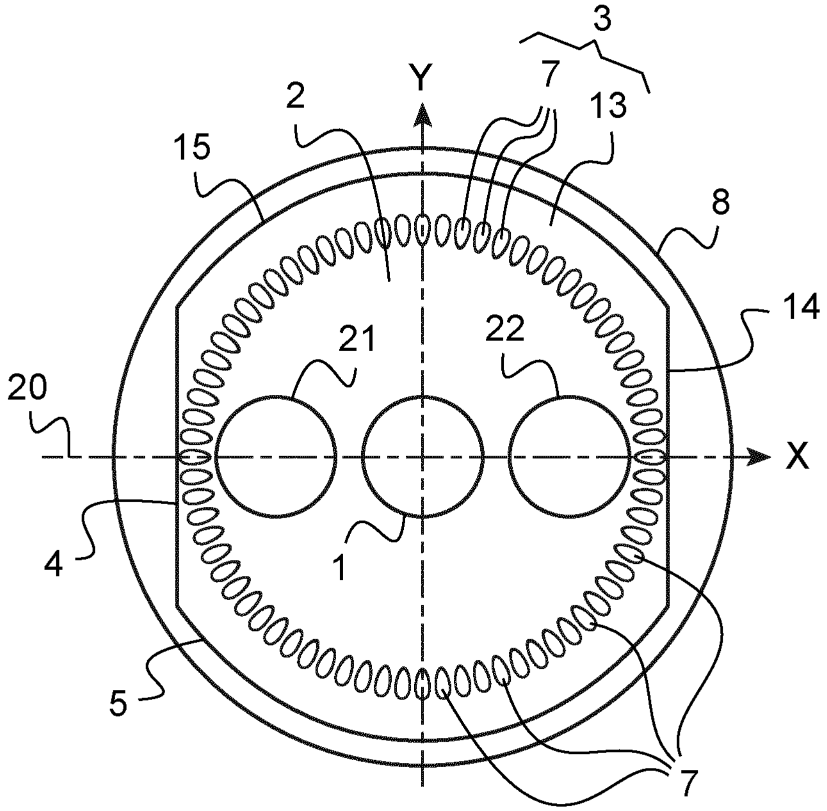

According to a variant of the second embodiment, the second cladding 3 includes an air cladding 7 surrounding the first cladding 2. The air cladding 7 is embedded in a solid matrix 13 made of a second glass (see FIG. 8D). And the outer cladding 8 is made of high index acrylate coating.

When the second cladding 3 is made of a second glass whose index is lower than the first cladding 2 (FIG. 8C) or includes an air cladding 7 surrounding the first cladding 2 with the air cladding 7 embedded in a solid matrix 13 made of a second glass (FIG. 8D), an outer cladding 8 made of a thin metal can be applied. For example, the outer cladding is made of aluminum, copper or gold, with a maximum thickness of about 15 μm. Due to the relatively small thickness of the metal cladding relatively to the fiber diameter (about 220 μm), the stiffness of the second cladding 3 bearing the two flat surfaces 4, 14 is such that the optical fiber 100 may be bent preferably in a bending plane 30 transverse to the flat surfaces 4, 14.

Thus, the fiber may be all-solid (when there is no air cladding) or of the holey fiber type (when there is an air cladding 7 between the first cladding 2 and the solid matrix 13 of the second cladding 3).

As an option, a low index polymer cladding 8 is placed around the second cladding 3.

Figure 3:
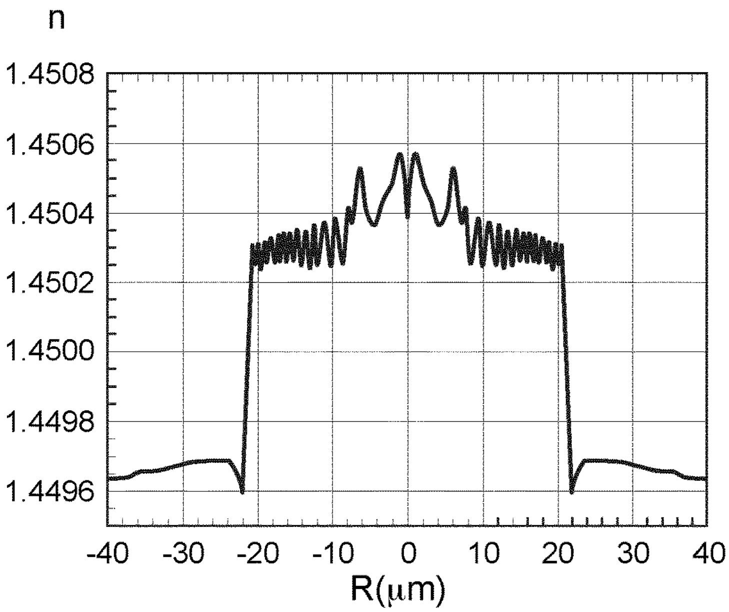
FIG. 3 represents an exemplary measurement of refractive index profile for an optical fiber designed according to the present disclosure and illustrated in cross-section on FIG. 4.
Figure 4:
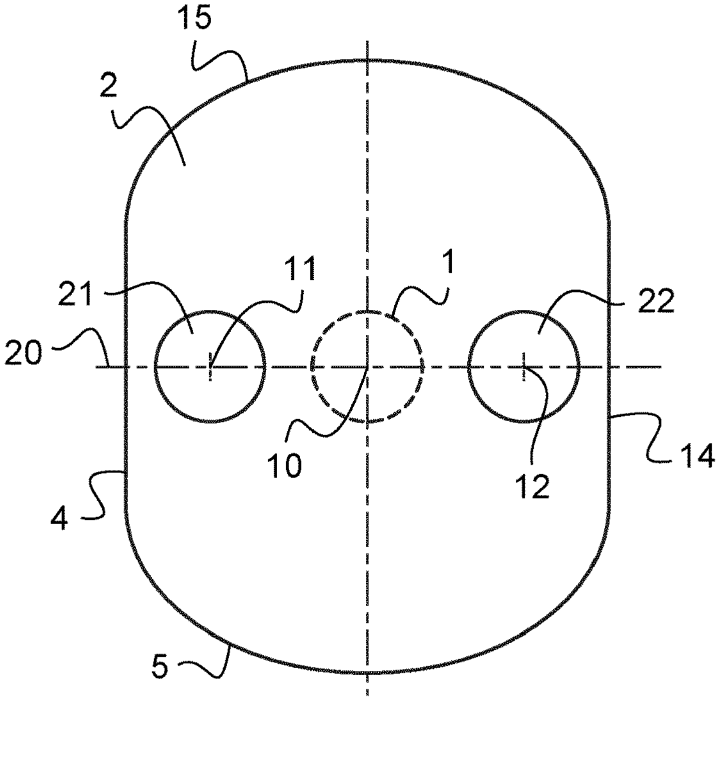
FIG. 4 represents schematically a cross-section image by scanning electron microscope of a step-index large mode area optical fiber according to the first embodiment of the present disclosure.

In an example according to the first embodiment, the fiber has flat-top refractive index profile as illustrated on FIG. 2A. FIG. 4 schematically shows a figure derived from a SEM micrograph of a cross-section of the polarization-maintaining fiber. The fiber has a core diameter of about 43.6 μm and a first cladding diameter ($2a$) of 246 μm. The length C of the flat surfaces 4, 14 in the cross-section plane is about 110 μm. The refractive index difference between the core and the first glass is about $7.0\times10^{-4}$. The stress applying parts 21, 22 are boron doped and have a diameter of 47 μm. The distance between the core center and the center of the stress applying part is about 65 μm. FIG. 3 shows measurement of refractive index profile measured at 633 nm for the core and first cladding of this optical fiber. The core has a refractive index of about 1.4496±0.0001 and the first glass has a refractive index of about 1.4503±0.0001, thus the refractive index difference between the core and the first glass of the first cladding is about $7\times10^{-4}$. When operating at a wavelength of 1064 nm, this optical fiber has a very large mode area (VLMA) of about 790 $\mu m^2$ and a mode field diameter of 31.75 μm. However, when this fiber is straight, it does not operate as a single-mode fiber. Due to the large core diameter and to the small refractive index difference, the guided modes $LP_{01}$ and $LP_{11}$ can propagate in the core along the straight fiber. Nevertheless, the fiber is birefringent (i.e. at polarization-maintaining) which enables to lift degeneracy of the modes polarized along the x-axis and y-axis of the fiber. In particular, as concerns the $LP_{01}$ mode and, respectively, $LP_{11}$ mode, they are split into $LP_{01x}$ and $LP_{01y}$ modes and, respectively, into $LP_{11xe}$, $LP_{11ye}$, $LP_{11x0}$ and $LP_{11y0}$ modes.

According to the present disclosure, the optical fiber 100 is bent in a bending plane 30 inclined by an angle θ with respect to the alignment axis 20 of the SAPs. The trace of the bending plane in the cross-section plane of the fiber is also denoted the curvature axis or bending axis of the fiber coil.

Figure 5:
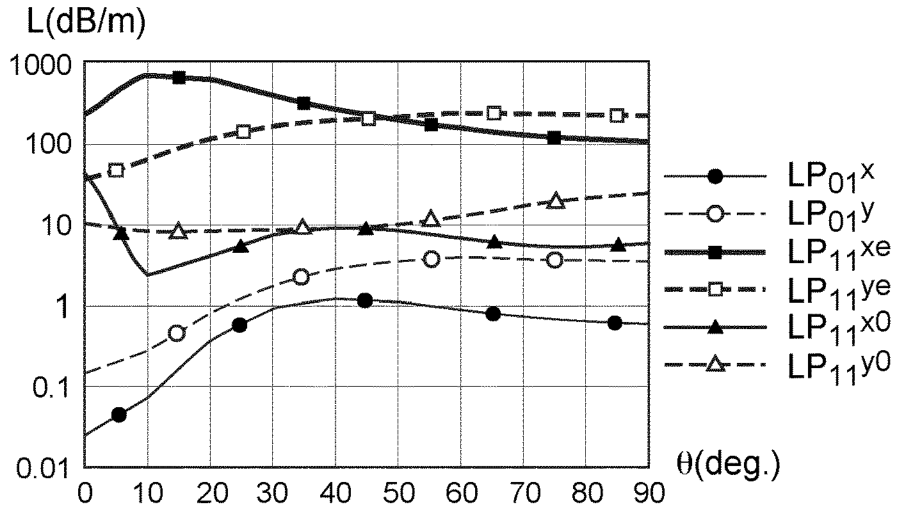
FIG. 5 represents measurement of mode losses for a fiber bent as a function of the orientation angle θ between the bending plane and the alignment axis of the stress applying parts, as schematically represented on FIG. 1.

FIG. 5 illustrates the total losses of the guided modes $LP_{01}$ and $LP_{11}$ for an optical fiber having the numerical features mentioned above and bent with a bending diameter of 18 cm. When the angle θ is comprised between 40 and 90 degrees, all the modes have losses higher than ~1 dB/m. The fiber operates in a quasi-single mode and single-polarization since the losses both of the higher order modes (HOM, here $LP_{11}$) and the y-polarized fundamental mode (FM, here $LP_{01y}$) are more than 10 dB/m. However, the losses of the x-polarized fundamental mode ($LP_{01x}$) are too high for a practical use in a fiber amplifier or fiber laser.

When the angle θ is less than 10 degrees, the losses of the $LP_{01x}$ mode decrease to less than 0.1 dB/m and become negligible when the bending axis is aligned with the alignment axis 20 (in other words, when the angle θ is zero).

The single-mode operation of the optical fiber is optimal when the angle θ is less than 5 degrees: the losses of the higher order modes (HOM, here $LP_{11}$) are more than 10 dB/m while the losses of the x-polarized fundamental mode ($LP_{01x}$) are less 0.05 dB/m.

Figure 6:
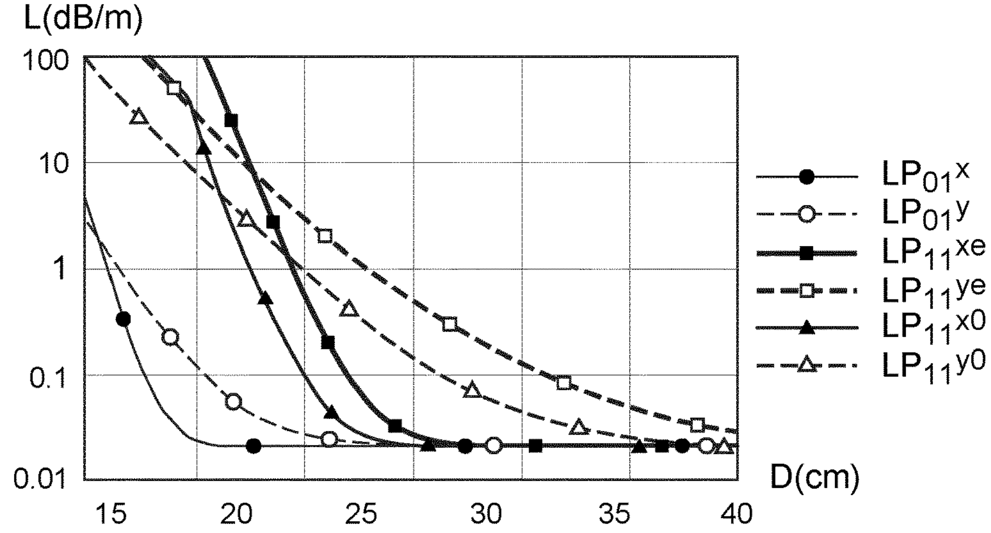
FIG. 6 represents measurement of mode losses for a VLMA fiber according to the present disclosure as a function of the bending diameter when the fiber is bent in a plane parallel to the alignment axis of the stress applying parts.
Figure 7:
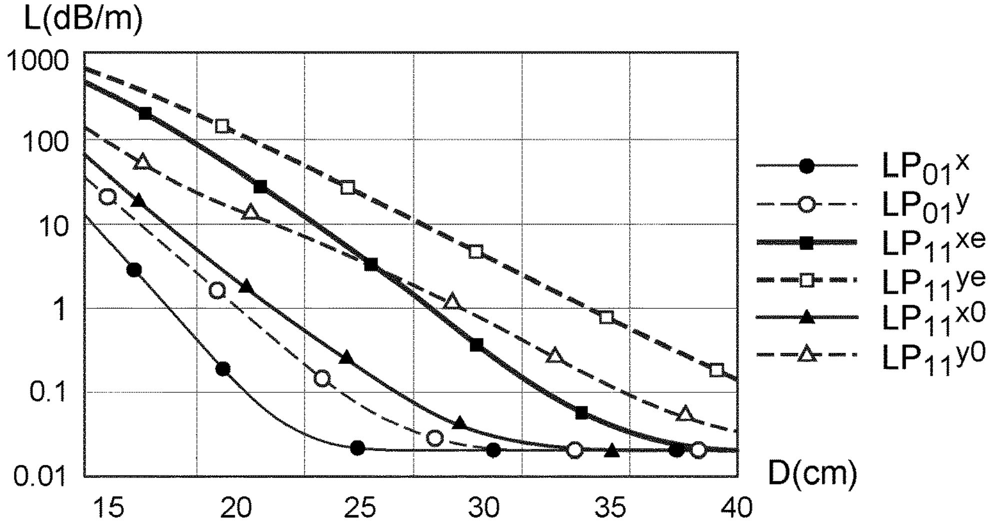
FIG. 7 represents measurement of mode losses for a VLMA fiber as a function of the bending diameter when the fiber is bent in a plane perpendicular to the alignment axis of the stress applying parts.

FIG. 6 illustrates the total losses of the guided modes for a direction of the bending axis along the alignment axis of the SAPs or when the angle θ is zero. FIG. 7 illustrates the total losses of the guided modes for a direction of the bending axis perpendicular to the alignment axis of the SAPs, i.e. along y direction, or when the angle θ is 90 degrees.

On FIG. 6, when the optical fiber 100 is bent in a plane parallel to the alignment axis 20 of the fiber core and SAPs, the losses of the fundamental mode $LP_{01x}$ remain low, here less than 0.05 dB/m while the losses of the higher order modes are higher than 10 dB/m for a fiber bend diameter lower than 19 cm. Thus, this optical fiber operates naturally in single mode when bent in a plane parallel to the alignment axis of the stress applying parts with a bending diameter in a range less than 21 cm, or even better less than 19 cm. In order to limit the losses in the fundamental mode, especially for fibers a few meters long, the bend diameter is preferably higher than 15 cm, and preferably higher than 16 cm. For instance, the bending diameter is comprised between 16 cm and 19 cm, and preferably between 17 cm and 18 cm.

In contrast, as illustrated on FIG. 7, when the optical fiber 100 is bent in a plane perpendicular to the alignment axis 20 of the fiber core and SAPs, the losses for the fundamental mode increase and become higher than 0.1 dB/m for a bend diameter lower than 20 cm whereas the losses of at least one of the higher order modes remain low (less than 1 dB/m) for a bend diameter higher than 19 cm. Thus, this optical fiber cannot operate in single-mode when bent in a plane perpendicular to the alignment axis of the stress applying parts.

The boron doped stress applying parts 21, 22 produce two technical effects when the fiber is bent in a plane inclined by an angle lower than 15 degrees with respect to the alignment axis of the stress applying parts. First, the fundamental mode presents a higher confinement due to the two boron doped stress applying parts. Thus, the losses of the fundamental mode ($LP_{01x}$) are negligible when the fiber is coiled or bent in a plane parallel to the alignment axis 20. Second, a part of the electromagnetic field of the higher order modes extends in the boron doped stress applying parts, which induce high losses. Thus, the higher order modes do not present the same confinement as the $LP_{01x}$ fundamental mode. The optical fiber of the present disclosure, when bent in a plane transverse to the flat surfaces, enables single-mode operation with limited losses (less than 0.5 dB/m) for the fundamental mode.

In the present document, a confinement degree refers to a proportion of the mode considered to be contained in a given radius relatively to the center of the fiber, and thus to the center of the core. A mode properly confined in the core presents a confinement degree close to 1 or about 100%.

Moreover, the orientation of the two flat surfaces 4, 14 induces preferential bending of the fiber with a curvature radius parallel to the alignment axis 20 or x-axis, when the fiber is placed on a plane. For example, the fiber is placed between two flat planes and the two ends of the fiber are maintained so that its flat surfaces 4, 14 are oriented perpendicular to the flat planes. Then, when coiling the fiber, the fiber bends naturally so that the alignment axis of the stress applying parts remains parallel to the two flat planes.

Another example of a very large mode area fiber according to the present disclosure has the following features. The core diameter is 35 μm. The core is made of a silica matrix doped with ytterbium ions. The refractive index difference between core and first glass is about $7.3\times10^{-4}$ The first cladding includes two boron doped stress applying parts, each having a diameter of 48 μm. The center-to-center distance between the core and each of the stress applying part is 62.5 μm. The fiber diameter is 220 μm. The length of the flat surfaces in the cross-section plane is 110 μm. The flat surfaces 4, 14 are oriented in a plane transverse to the bending radius of the fiber. The bending diameter is between 15 cm and 18 cm. When operating at a wavelength of 1064 nm, the effective area of this fiber is 615 $\mu m^2$ which corresponds to a mode field diameter of 28 μm. The losses for the high order modes are higher than 10 dB/m while the losses for the $LP_{01x}$ fundamental mode remain lower than 0.1 dB/m.

The amplifying fiber 100 generates amplified light at a wavelength depending on the doping elements in the core. When doped with ytterbium ions, the VLMA single mode amplifying fiber 100 is adapted for amplifying light in the wavelength range from 950 nm to 1150 nm. When doped with erbium ions, the VLMA single mode amplifying fiber 100 is adapted for amplifying light in the wavelength range from 1530 nm to 1610 nm. When doped with thulium ions, the VLMA single mode amplifying fiber 100 is adapted for amplifying light in the wavelength range from 1900 nm to 2100 nm. When doped with holmium ions, the VLMA single mode amplifying fiber 100 is adapted for amplifying light in the wavelength range from 1950 nm to 2160 nm. Those skilled in the art will easily select the appropriate doping composition of the core depending on the desired operating wavelength range. Of course, the seed light source and the pump source(s) are adapted accordingly.

The present disclosure thus proposes a very large mode area polarization-maintaining and amplifying fiber, operating in single-mode regime which provides negligible losses for the fundamental mode. For example, the polarization-maintaining fiber is of Panda-type. Preferably, the fiber core is rare earth doped.

Such a VLMA fiber finds applications in both high power continuous wave or pulse of high peak power fiber amplifiers or fiber lasers while providing strictly single-mode operation.

The fiber is bent with bending diameter comprised between 10 cm and 30 cm, which enables the use of a fiber having a length comprised between 50 cm and a few meters or tens of meters, while providing a compact footprint with a low loss single-mode regime. Moreover, when the fiber is of the step-index type, it is easy to manufacture at low cost. The fiber is also easy to cleave and splice to another fiber, which enables industrial manufacture of an all-fiber laser system.

Figure 9:
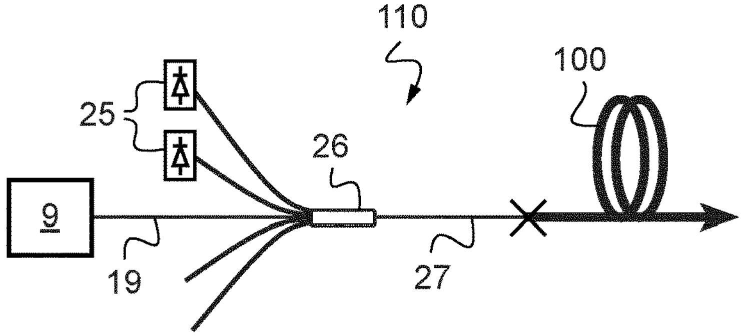
FIGS. 9 and 10 represent two variants of a fiber amplifier comprising a VLMA single-mode amplifying fiber according to the present disclosure.

FIG. 9 shows a first example of a fiber amplifier 110 comprising a VLMA single-mode amplifying optical fiber 100 in a forward pumping configuration. The VLMA single-mode amplifying optical fiber 100 consists of an optical fiber according to any of the embodiments disclosed. In the fiber amplifier 110, a continuous wave (CW) or pulse laser is used as seed source to be amplified by the VLMA single-mode amplifying optical fiber 100. The output of the light source 9 is spliced to the input signal arm 19 of a double clad pump-signal combiner 26. The fiber amplifier 110 comprises one or several pump sources 25 for generating a pump radiation adapted for optically pumping the doping elements of the core so as to amplify the seed signal. The pump-signal combiner 26 is connected, on its input side, to the light source 9 and pump(s) 25 and, on its output side, to a first end of the VLMA single-mode amplifying optical fiber 100, for example via a section of a passive double clad optical fiber 27. The beam combiner 26 combines the seed signal and the pump beam. Thus, the seed signal is injected into the core 1 of the optical fiber 100 and the pump beam is injected into the glass cladding of the fiber 100. Amplified signals are generated at the second end of the VLMA single-mode amplifying optical fiber 100.

Figure 10:
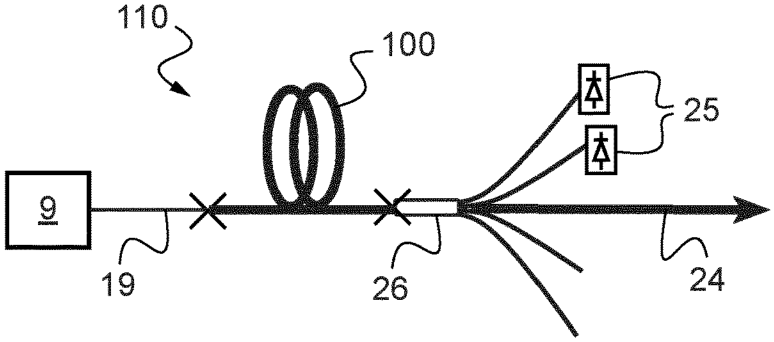

FIG. 10 shows an alternative embodiment of the fiber amplifier 110 in a backward pumping configuration. Here, the seed light source 9 is connected to the first end of the VLMA single-mode amplifying optical fiber 100 for example using a conventional single-mode fiber splice. A pump-signal combiner 26 is connected, on one side, to the second end of the VLMA single-mode amplifying optical fiber 100 and, on the other side, to the pump(s) 25 and to another fiber splice 24. Amplified pulses are available at the output of the fiber splice 24.

Figure 11:
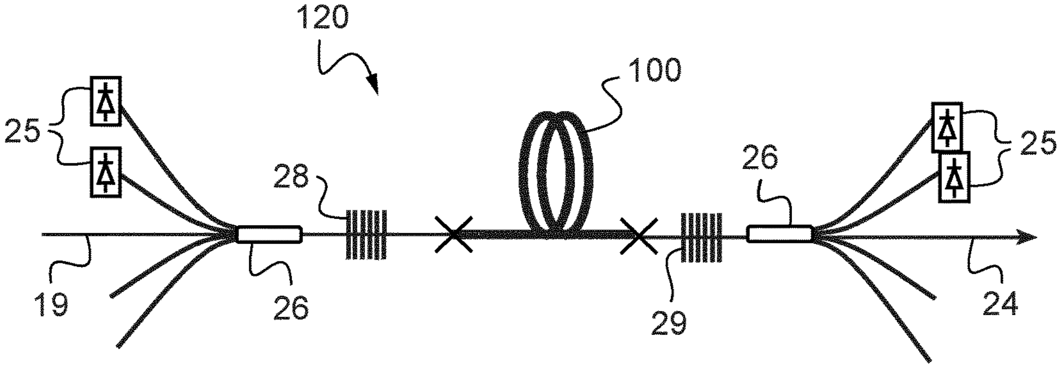
FIG. 11 represents a fiber laser system comprising a VLMA single-mode amplifying fiber according to the present disclosure.

The VLMA single-mode amplifying optical fiber 100 can also be used in a fiber laser. FIG. 11 schematically illustrates the structure of a laser fiber 120 based on a fiber 100 according to any of the embodiments disclosed. The VLMA single-mode amplifying optical fiber 100 is placed in a cavity formed by two mirrors. For example, the cavity is formed by a first fiber Bragg grating 28 placed at the first end of the VLMA single-mode amplifying optical fiber 100 and a second fiber Bragg grating 29 placed at the second end of the VLMA single-mode amplifying optical fiber 100. Alternatively, the cavity is formed by bulk dielectric or metallic mirrors and signal injection in the VLAM fiber is achieved in free space. The fiber laser using the VLMA single-mode amplifying optical fiber 100 can be arranged in a forward, backward or bidirectional pumping configuration.

Figure 12:
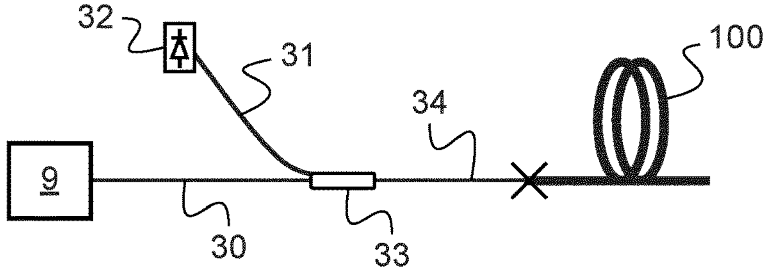
FIG. 12 represents a core pumped fiber amplifier comprising a VLMA single-mode amplifying fiber according to the present disclosure.

The VLMA single-mode amplifying optical fiber 100 can also be core-pumped. FIG. 12 schematically illustrates the structure of a fiber amplifier 130 based on a fiber 100 according to any of the embodiments disclosed wherein the optical fiber 100 is core pumped. In this configuration, the output of the seed laser 9 and the single mode output of the pump laser 32 are coupled into the multiplexer 33 respectively to the 30 and 31 input legs of the multiplexer 33. The multiplexer output leg 34 is spliced to the input end of the VLMA single-mode amplifying optical fiber 100. Thus, both the seed signal and the single mode pump are injected into the core 1 of the optical fiber 100. Advantageously, the optical fiber 100 is a single clad fiber (for example as illustrated on FIG. 1, 4 or 8A). Amplified signals are generated at the second end of the VLMA single-mode amplifying optical fiber 100.

Although representative examples of VLMA single amplifying optical fibers, fiber amplifiers and fiber lasers have been described in detail herein, those skilled in the art will recognize that various substitutions and modifications may be made without departing from the scope of the present disclosure and defined in the appended claims.

The invention claimed is:

1. Very-A very large mode area single-mode amplifying optical fiber comprising:

a core extending along a longitudinal axis of the optical fiber, the core being solid and doped with elements presenting at least one emission band, the core having a core diameter larger than 30 micrometers, said core being surrounded by at least one glassy cladding comprising a first cladding comprising a solid matrix made of a first glass and two stress applying parts disposed symmetrically with respect to the core, the first glass having a lower refractive index than the core, the core and the two stress applying parts being aligned along an alignment axis transverse to the longitudinal axis, the core having a numerical aperture comprised between 0.038 and 0.054, wherein the at least one glassy cladding comprises, on its outer periphery, two and only two flat surfaces extending parallel to the longitudinal axis and being perpendicular to the alignment axis, the two flat surfaces being disposed symmetrically with respect to the core and being joined by two rounded surfaces having a shape of an arc of a circle, and wherein the optical fiber is configured to be bent with a bending diameter comprised between 10 cm and 30 cm in a plane comprising the longitudinal axis of the fiber and said plane forming an angle of less than 15 degrees with the alignment axis while having bending losses for the fundamental mode less than 0.5 dB/m and bending losses equal or greater than 10 dB/m for high order modes.

2. The very large mode area single-mode amplifying optical fiber according to claim 1, wherein the bending diameter is comprised between 10 cm and 20 cm, with bending losses for the fundamental mode less than 0.5 dB/m.

3. The very large mode area single-mode amplifying optical fiber according to claim 1, wherein the optical fiber is bent in a plane forming an angle of less than 10 degrees with the alignment axis.

4. The very large mode area single-mode amplifying optical fiber amplifier according to claim 1, wherein said very large mode area single-mode amplifying optical fiber presents an effective area greater than 450 $\mu m^2$.

5. The very large mode area single-mode amplifying optical fiber according to claim 1, wherein the core and first glass are based on silica glass or on fluoride glass or on chalcogenide glass or on phosphate glass.

6. The very large mode area single-mode amplifying optical fiber according to claim 1, wherein the core is doped with rare earth ions or with chromium ions.

7. The very large mode area amplifying optical fiber according to claim 1, wherein the core presents a flat-top or a parabolic refractive index profile, or wherein the core comprises a pedestal surrounding a central part of the core, the pedestal having a refractive index lower than the central part of the core and higher than the first glass.

8. The very large mode area single-mode amplifying optical fiber according to claim 1, wherein the at least one glassy cladding consists of the first cladding, the first cladding comprising, on its outer periphery, the two flat surfaces.

9. The very large mode area single-mode amplifying optical fiber according to claim 1, wherein the at least one glassy cladding comprises a second cladding arranged around the first cladding, the second cladding having a lower refractive index than the first glass.

10. The very large mode area single-mode amplifying optical fiber according to claim 9, wherein the second cladding is selected from an all solid cladding made of a second glass or an air cladding and a solid cladding made of a second glass, the air cladding being arranged between the first cladding and the solid cladding made of the second glass.

11. The very large mode area single-mode amplifying optical fiber according to claim 1, further comprising a polymer or metal cladding around said at least one glassy cladding.

12. A fiber amplifier comprising:

the very large mode area single-mode amplifying optical fiber according to claim 1, said very large mode area single-mode amplifying optical fiber being spooled with a bending diameter less than 30 cm.

13. The fiber amplifier according to claim 12, wherein said very large mode area single-mode amplifying optical fiber has a length comprised between 50 cm and 20 m.

14. The fiber amplifier according to claim 12, further comprising a pump source generating a pumping beam and an optical beam combiner adapted for injecting said pumping beam into the core and/or into the first cladding.

15. A fiber laser comprising:

the very large mode area single-mode amplifying optical fiber according claim 1, said very large mode area single-mode amplifying optical fiber being spooled with a bending diameter less than 30 cm;

a light source generating a source beam to be amplified;

a first mirror at a first end of the very large mode area single-mode amplifying optical fiber; and a second mirror at a second end of the very large mode area single-mode amplifying optical fiber.

16. The fiber amplifier according to claim 13, further comprising a pump source generating a pumping beam and an optical beam combiner configured to inject said pumping beam into one or more of the core and the first cladding.

* * * * *